(12) United States Patent
Lai et al.

(10) Patent No.: US 10,538,626 B2
(45) Date of Patent: Jan. 21, 2020

(54) POLYIMIDE RESIN, THIN FILM AND METHOD FOR MANUFACTURING THEREOF

(71) Applicant: Microcosm Technology Co. Ltd., Tainan (TW)

(72) Inventors: Bo-Hung Lai, Tainan (TW); Wei-Ming Hou, Tainan (TW); Tang-Chieh Huang, Tainan (TW)

(73) Assignee: Microcosm Technology Co., Ltd, Tainan (TW)

( * ) Notice: Subject to any disclaimer, the term of this patent is extended or adjusted under 35 U.S.C. 154(b) by 0 days.

(21) Appl. No.: 15/645,594

(22) Filed: Jul. 10, 2017

(65) Prior Publication Data

US 2018/0230270 A1 Aug. 16, 2018

(30) Foreign Application Priority Data

Feb. 15, 2017 (TW) .............................. 106104879 A

(51) Int. Cl.
*C08G 73/10* (2006.01)
*C08J 5/18* (2006.01)
*C09D 179/08* (2006.01)

(52) U.S. Cl.
CPC ..... *C08G 73/1042* (2013.01); *C08G 73/1032* (2013.01); *C08G 73/1039* (2013.01); *C08G 73/1064* (2013.01); *C08G 73/1071* (2013.01); *C08J 5/18* (2013.01); *C09D 179/08* (2013.01); *C08J 2379/08* (2013.01)

(58) Field of Classification Search
CPC ............ C08G 73/1042; C08G 73/1039; C08G 73/105; C08G 73/1046
See application file for complete search history.

(56) References Cited

U.S. PATENT DOCUMENTS

| | | | | |
|---|---|---|---|---|
| 4,603,061 A * | 7/1986 | St. Clair | ............ | C08J 5/18 264/212 |
| 2010/0279131 A1* | 11/2010 | Park | ............ | C08G 73/10 428/473.5 |
| 2011/0059305 A1* | 3/2011 | Kaneya | ............ | C08G 73/1039 428/220 |
| 2011/0155235 A1* | 6/2011 | Tseng | ............ | C08G 73/1039 136/256 |
| 2011/0178266 A1* | 7/2011 | Cho | ............ | C08G 73/1028 528/353 |
| 2011/0188901 A1* | 8/2011 | Pietrantoni | ............ | B05D 5/12 399/308 |
| 2011/0245455 A1* | 10/2011 | Jeong | ............ | C08G 73/1039 528/353 |
| 2012/0041156 A1* | 2/2012 | Jeong | ............ | C08G 73/1039 525/436 |
| 2012/0156482 A1* | 6/2012 | Hisano | ............ | B29C 41/24 428/343 |
| 2013/0035447 A1* | 2/2013 | Jeong | ............ | C08G 73/1039 525/436 |
| 2014/0171588 A1* | 6/2014 | Liang | ............ | C08K 5/13 524/600 |
| 2014/0238594 A1* | 8/2014 | Yoon | ............ | G02B 1/10 156/280 |
| 2014/0243482 A1* | 8/2014 | Park | ............ | C08G 73/14 525/450 |
| 2014/0367151 A1* | 12/2014 | Song | ............ | H01B 1/24 174/255 |
| 2016/0251545 A1* | 9/2016 | Yun | ............ | C08J 5/18 524/606 |
| 2017/0008254 A1* | 1/2017 | Huang | ............ | B32B 15/043 |
| 2017/0009017 A1* | 1/2017 | Huang | ............ | C08G 73/1046 |
| 2017/0282414 A1* | 10/2017 | Liou | ............ | B32B 7/12 |
| 2018/0028984 A1* | 2/2018 | Chou | ............ | B01D 71/64 |
| 2018/0134848 A1* | 5/2018 | Ju | ............ | C08J 5/18 |
| 2018/0171077 A1* | 6/2018 | Oka | ............ | C08G 73/1071 |

FOREIGN PATENT DOCUMENTS

WO    WO-2016175344 A1 * 11/2016 ................ C08J 5/18

* cited by examiner

*Primary Examiner* — Liam J Heincer
(74) *Attorney, Agent, or Firm* — Haverstock & Owens LLP

(57) ABSTRACT

A transparent and colorless polyimide resin is provided. The polyimide resin is derived from at least two dianhydride monomers and at least two diamine monomers. At least one monomer in the dianhydride and diamine monomers includes structure of formula (1). The monomer with structure of formula (1) has an amount of moles accounting for 10-50% of total moles of the dianhydride or diamine monomers.

(1)

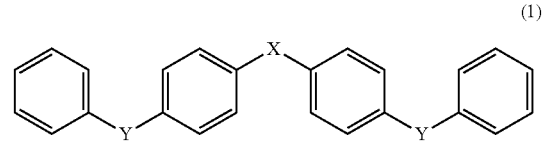

In formula (1), X is $SO_2$, $C(CH_3)_2$ or $C(CF_3)_2$, Y is oxygen.

15 Claims, 6 Drawing Sheets

POLYIMIDE RESIN, THIN FILM AND METHOD FOR MANUFACTURING THEREOF

BACKGROUND OF THE INVENTION

Field of the Invention

The present invention relates to a polyimide resin, a method for preparing the same, and a thin film, and particularly to a colorless transparent polyimide resin having a low dissipation factor. The polyimide resin can be used in the insulation substrate of a touch panel, a display device, a flexible circuit board, an antenna, and a high-frequency transmission line.

Description of the Prior Art

In wireless communication technology, electronic equipment must be provided with antenna for offering wireless communication function. As the number of antennae becomes more and more, antennae are squeezed in the mobile phone. Due to the requirement of beautiful look and installation flexibility, the demand for transparent antenna is gradually increasing.

Since the signal transmission speed of the high-frequency substrate is inversely proportional to the square root of the dielectric constant (Dk) of the substrate, it is generally preferred that the dielectric constant of the substrate is as small as possible. Also, the smaller the dissipation factor (Df) is, the less the signal transmission loss will be, and thus a better transmission quality can be offered. Therefore, for maintaining the high-frequency transmission rate and the integrity of transmission signals, the high-frequency substrate must have both a smaller dielectric constant and a smaller dissipation factor.

Currently, the common high-frequency flexible substrate is mainly composed of liquid crystal polymer (LCP) film. However, the unique molecular structure characteristics of LCP are prone to generation of excess forward alignment, thereby resulting in poor mechanical properties in the transverse direction, and leaving the LCP film processing and product application being severely restricted. In addition, LCP is also poor in terms of transparency.

Polyimide has good dimensional stability, heat resistance, thermal expansion coefficient, mechanical strength, and resistance insulation, and has been widely used in the electronic industry. However, due to its high aromatic ring density, polyimide exhibits a color of brown or yellow, resulting in low transmittance and poor transparency under visible light.

SUMMARY OF THE INVENTION

In view of the issues described above, the present invention provides a polyimide resin, a method for preparing the same, and a thin film. The polyimide resin of the present invention not only retains good properties of the material itself, such as heat resistance, chemical resistance, mechanical strength and resistance insulation, but also has a low dissipation factor and a transparent colorless property, and thus is suitable for use in high frequency substrates, transparent antennae, and transparent flexible substrates.

According to an aspect of the present invention, a colorless transparent polyimide resin is provided. The colorless transparent polyimide resin is formed from the copolymerization of at least two dianhydride monomers and at least two diamine monomers.

One of the dianhydride monomers used in the colorless transparent polyimide resin is 2,2'-bis-(3,4-dicarboxyphenyl)hexafluoropropane dianhydride (6FDA), the content of which is 30-60%, based on the total number of moles of the dianhydride monomers. The remaining dianhydride monomer is selected from the group consisting of 4,4'-diphenylether tetraanhydride (ODPA), biphenyltetracarboxylic dianhydride (BPDA), 3,3',4,4'-diphenylsulfonetetraanhydride (DSDA), 4,4'-(4,4'-isopropyl diphenoxy)bis(phthalic anhydride) (BPADA), and 2,2-bis[4-(3,4-dicarboxyphenoxy)phenyl]hexafluoroisopropane dianhydride (HFBPADA).

The diamine monomer used in the colorless transparent polyimide resin is selected from the group consisting of bis[4-(4-aminophenoxy)phenyl]sulfone (BAPS), 2,2'-bis[4-(4-aminophenoxy)phenyl]propane (BAPP), 2,2-bis[4-(4-aminophenoxy)phenyl]-1,1,1,3,3,3-hexafluoropropane (HF-BAPP), 2,2'-bis(trifluoromethyl)benzidine (TFMB), 4,4'-diaminodiphenylether (ODA), 3,3'-diaminodiphenylsulfone (33-DDS), M-TOLI DINE, and 2,2-bis(4-aminophenyl)hexafluoropropane (BISAF).

At least one of the dianhydride monomers and the diamine monomers has a structure of Formula 1, and a content of the monomer having the structure of Formula 1 is 10-50%, based on the total number of moles of the dianhydride monomers or the diamine monomers.

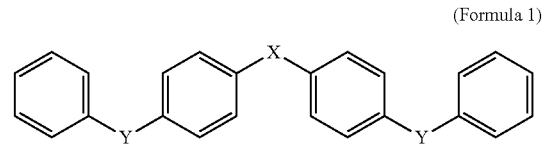

(Formula 1)

In formula 1, X is $SO_2$, $C(CH_3)_2$ or $C(CF_3)_2$, and Y is oxygen.

In an embodiment, the colorless transparent polyimide resin has a dissipation factor of less than 0.01 at 10 GHz, a transmittance of more than 85% at a wavelength of 550 nm, and a yellow value (b*) of less than 3.

In an embodiment, the colorless transparent polyimide resin has a glass transition temperature of higher than 270° C. and a coefficient of linear thermal expansion between 20 and 50 ppm/k.

According to another aspect of the present invention, a method for preparing a colorless transparent polyimide resin is provided. The method includes the steps of:

(a) At least two dianhydride monomers and at least two diamine monomers are dissolved using a solvent. One of the dianhydride monomers is 2,2'-bis-(3,4-dicarboxyphenyl)hexafluoropropane dianhydride (6FDA), the content of which is 30-60%, based on the total number of moles of the dianhydride monomers. The remaining dianhydride monomer is selected from the group consisting of 4,4'-diphenylether tetraanhydride (ODPA), biphenyltetracarboxylic dianhydride (BPDA), 3,3',4,4'-diphenylsulfonetetraanhydride (DSDA), 4,4'-(4,4'-isopropyl diphenoxy)bis(phthalic anhydride) (BPADA), and 2,2-bis[4-(3,4-dicarboxyphenoxy)phenyl]hexafluoroisopropane dianhydride (HFBPADA). The diamine monomers are selected from the group consisting of bis[4-(4-aminophenoxy)phenyl]sulfone (BAPS), 2,2'-bis[4-(4-aminophenoxy)phenyl] propane (BAPP), 2,2-bis[4-(4-aminophenoxy)phenyl]-1,1,1,3,3,3-hexafluoropropane (HFBAPP), 2,2'-bis(trifluoromethyl)benzidine (TFMB), 4,4'-diaminodiphenylether (ODA), 3,3'-diaminodiphenylsulfone (33-DDS), M-TOLIDINE, and 2,2-bis(4-aminophenyl)hexafluoropropane (BISAF). At least one of the dianhydride monomers and the diamine monomers has a structure of Formula 1, and a content of the monomer having the structure of Formula 1 is 10-50%, based on the total number of moles of the dianhydride monomers or the diamine monomers.

(Formula 1)

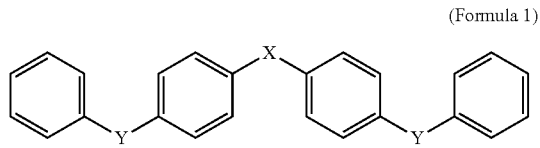

In formula 1, X is $SO_2$, $C(CH_3)_2$ or $C(CF_3)_2$, and Y is oxygen;

(b) The dissolved dianhydride monomers are mixed with the dissolved diamine monomers to carry out a polymerization reaction, thereby forming a polyamic acid resin, wherein the ratio of the total number of moles of the dianhydride monomers to the total number of moles of the diamine monomers is from 0.85 to 1.15; and (c) the polyamic acid resin is imidized to form the colorless transparent polyimide resin.

In an embodiment, the solvent is an aprotic solvent.

In an embodiment, the solvent is selected from the group consisting of N,N-dimethylacetamide, N,N-diethylacetamide, N,N-dimethylformamide, and N-methyl-2-pyrrolidone.

According to still another aspect of the present invention, a colorless transparent polyimide resin made by the method described above is provided, and the polyimide resin has a dissipation factor of less than 0.01 at 10 GHz, a transmittance of more than 85% at a wavelength of 550 nm, and a yellow value (b*) of less than 3.

According to still another aspect of the present invention, a colorless transparent polyimide resin made by the method described above is provided, and the polyimide resin has a glass transition temperature of higher than 270° C. and a coefficient of linear thermal expansion between 20 and 50 ppm/k.

According to yet another aspect of the present invention, a thin film including the colorless transparent polyimide resin described above is provided.

According to other aspects of the present invention, a flexible circuit board, a substrate for a display device, a substrate for a touch panel, a substrate for a transparent antenna, and a substrate for a high-frequency transmission line comprising the thin film described above are provided.

The above and other aspects of the present invention will become more apparent from the following embodiments when taken in conjunction with the accompanying drawings.

DETAILED DESCRIPTION OF THE EMBODIMENTS

Figure 1:
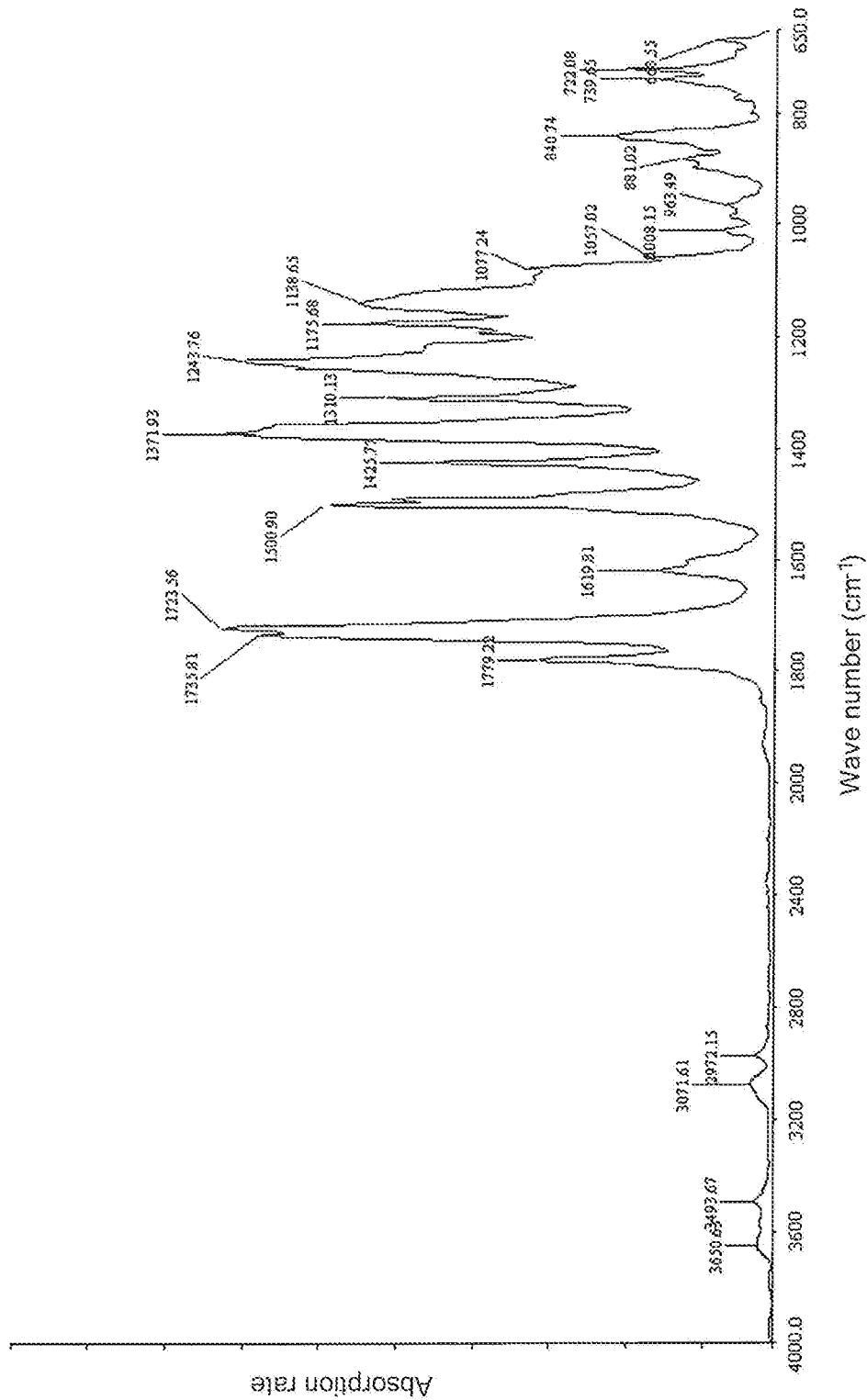
FIG. 1 is the IR spectrum of the polyimide resin of Embodiment 1.

The colorless transparent polyimide resin provided by the present invention is obtained by polymerizing the dianhydride monomers and the diamine monomers into the polyamic acid resin (polyimide resin precursor) and then subjecting the polyamic acid resin to an imidization process.

The polymerization may be carried out by dissolving the dianhydride monomers and the diamine monomers with a solvent, and then mixing the dissolved dianhydride monomers with the dissolved diamine monomers to form the polyamic acid resin (polyimide resin precursor).

The solvent mentioned above may be an aprotic solvent, such as N,N-dimethylacetamide, N,N-diethylacetamide, N,N-dimethylformamide, and N-methyl-2-pyrrolidone, etc., but is not limited thereto. Other suitable aprotic solvents may be used.

The imidization process may use high temperature curing, for example, heating the polyamic acid resin (polyimide resin precursor) continuously or discontinuously. If the polyimide resin is made into a thin film or an insulating layer, the polyamic acid resin (polyimide resin precursor) may be coated on the substrate, which is then delivered into the oven for heating and curing. The conventional imidization process may also be used, and the present invention is not restricted regarding the process of imidization.

The colorless transparent polyimide resin of the present invention is obtained by copolymerizing at least two dianhydride monomers and at least two diamine monomers.

One of the dianhydride monomers is 2,2'-bis-(3,4-dicarboxyphenyl)hexafluoropropane dianhydride (6FDA), the content of which is 30-60%, based on the total number of moles of the dianhydride monomers. The remaining dianhydride monomer is selected from the group consisting of 4,4'-diphenylether tetraanhydride (ODPA), biphenyltetracarboxylic dianhydride (BPDA), 3,3',4,4'-diphenylsulfonetetraanhydride (DSDA), 4,4'-(4,4'-isopropyl diphenoxy)bis (phthalic anhydride) (BPADA), and 2,2-bis[4-(3,4-dicarboxyphenoxy)phenyl]hexafluoroisopropane dianhydride (HFBPADA). One or more dianhydride monomers may be selected from the above group.

The diamine monomer is selected from the group consisting of bis[4-(4-aminophenoxy)phenyl]sulfone (BAPS), 2,2'-bis[4-(4-aminophenoxy)phenyl]propane (BAPP), 2,2-bis[4-(4-aminophenoxy)phenyl]-1,1,1,3,3,3-hexafluoropropane (HFBAPP), 2,2'-bis(trifluoromethyl)benzidine (TFMB), 4,4'-diaminodiphenylether (ODA), 3,3'-diaminodiphenylsulfone (33-DDS), M-TOLI DINE, and 2,2-bis(4-aminophenyl)hexafluoropropane (BISAF). Two or more diamine monomers may be selected from the above group.

At least one of the dianhydride monomers and the diamine monomers described above has the structure of Formula 1 below.

(Formula 1)

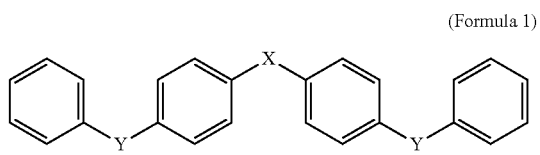

In formula 1, X is $SO_2$, $C(CH_3)_2$ or $C(CF_3)_2$, and Y is oxygen.

The dianhydride and the diamine monomer having the structure of Formula 1 includes 4,4'-(4,4'-isopropyl diphenoxy)bis(phthalic anhydride) (BPADA), 2,2-bis[4-(3,4-dicarboxyphenoxy)phenyl]hexafluoroisopropane dianhydride (HFBPADA), bis[4-(4-aminophenoxy)phenyl]sulfone (BAPS), 2,2'-bis[4-(4-aminophenoxy)phenyl]propane (BAPP), and 2,2-bis[4-(4-aminophenoxy)phenyl]-1,1,1,3,3,3-hexafluoropropane (HFBAPP).

The monomer having the structure of Formula 1 has a content of 10-50%, based on the total number of moles of dianhydride or diamine. For example, if the polyimide resin uses BPADA as the dianhydride monomer, the number of moles of BPADA will account for 10-50% of the total number of moles of the dianhydride monomers of the polyimide resin. If the polyimide resin includes two kinds of dianhydride monomers having the structure of formula 1, i.e. HFBPADA and BPADA, the total number of moles of HFBPADA and BPADA is 10-50%, based on the total number of moles of the dianhydride monomers. If the polyimide resin uses BPADA (dianhydride) and BAPP (diamine) monomers simultaneously, the total number of moles of BPADA and BPAA is 10-50%, based on the total number of moles of dianhydride or diamine monomers (referring to Example 13 below, both BPADA and BPAA have a content of 0.008 moles, totaling 0.016 moles, and account for 40% of the total amount (i.e. 0.04 moles) of dianhydride or diamine monomer).

In the colorless transparent polyimide resin of the present invention, the ratio of the total number of moles of the dianhydride monomer component to the total number of moles of the diamine monomer component is about 0.85 to 1.15.

The colorless transparent polyimide resin of the present invention has a dissipation factor of less than 0.01 at a frequency of 10 GHz, a transmittance of more than 85% at a wavelength of 550 nm, and a yellow value (b*) of less than 3, and thus possesses transparency and applicability to high frequency components.

The colorless transparent polyimide resin of the present invention has a glass transition temperature of higher than 270° C., a coefficient of linear thermal expansion between 20 and 50 ppm/k, and excellent thermal stability.

The colorless transparent polyamic acid resin and the method for preparing the same of the present invention are illustrated below with a plurality of examples, and the properties of the resin are measured.

Preparation of Polyamic Acid Solution (Polyimide Resin Precursor)

Example 1

8.97 g (0.028 mole) of 2,2'-bis(trifluoromethyl)benzidine (TFMB), 2.40 g (0.012 mole) of 4,4'-diaminodiphenylether (ODA), and 100 g of dimethylacetamide (DMAc) were placed into a three-necked flask. After stirring at 30° C. until complete dissolution, 4.16 g (0.008 mole) of 4,4'-(4,4'-isopropyl diphenoxy) bis(phthalic anhydride) (BPADA), 7.1 g (0.016 mole) of 2,2'-bis-(3,4-dicarboxyphenyl)hexafluoropropane dianhydride (6FDA), and 4.71 g (0.016 mole) of biphenyltetracarboxylic dianhydride (BPDA) were added, followed by continuous stirring and reaction at 25° C. for 24 hours to obtain a polyamic acid solution of Example 1.

Example 2

8.97 g (0.028 mole) of 2,2'-bis(trifluoromethyl)benzidine (TFMB), 2.4 g (0.012 mole) of 4,4'-diaminodiphenylether (ODA), and 100 g of dimethylacetamide (DMAc) were placed into a three-necked flask. After stirring at 30° C. until complete dissolution, 10.4 g (0.02 mole) of 4,4'-(4,4'-isopropyl diphenoxy)bis(phthalic anhydride) (BPADA), 5.33 g (0.012 mole) of 2,2'-bis-(3,4-dicarboxyphenyl)hexafluoropropane dianhydride (6FDA), and 2.35 g (0.008 mole) of biphenyltetracarboxylic dianhydride (BPDA) were added, followed by continuous stirring and reaction at 25° C. for 24 hours to obtain a polyamic acid solution of Example 2.

Example 3

8.97 g (0.028 mole) of 2,2'-bis(trifluoromethyl)benzidine (TFMB), 2.98 g (0.012 mole) of 3,3'-diamino diphenyl sulfone (3,3-DDS), and 100 g of dimethylacetamide (DMAc) were placed into a three-necked flask. After stirring at 30° C. until complete dissolution, 4.16 g (0.008 mole) of 4,4'-(4,4'-isopropyl diphenoxy)bis(phthalic anhydride) (BPADA), 10.66 g (0.024 mole) of 2,2'-bis-(3,4-dicarboxyphenyl)hexafluoropropane dianhydride (6FDA), and 2.35 g (0.008 mole) of biphenyltetracarboxylic dianhydride (BPDA) were added, followed by continuous stirring and reaction at 25° C. for 24 hours to obtain a polyamic acid solution of Example 3.

Example 4

8.97 g (0.028 mole) of 2,2'-bis(trifluoromethyl)benzidine (TFMB), 2.4 g (0.012 mole) of 4,4'-diaminodiphenylether (ODA), and 100 g of dimethylacetamide (DMAc) were placed into a three-necked flask. After stirring at 30° C. until complete dissolution, 4.16 g (0.008 mole) of 4,4'-(4,4'-isopropyl diphenoxy)bis(phthalic anhydride) (BPADA), 7.1 g (0.016 mole) of 2,2'-bis-(3,4-dicarboxyphenyl)hexafluoropropane dianhydride (6FDA), and 4.96 g (0.016 mole) of 4,4'-diphenylether tetraanhydride (ODPA) were added, followed by continuous stirring and reaction at 25° C. for 24 hours to obtain a polyamic acid solution of Example 4.

Example 5

8.97 g (0.028 mole) of 2,2'-bis(trifluoromethyl)benzidine (TFMB), 2.4 g (0.012 mole) of 4,4'-diaminodiphenylether (ODA), and 100 g of dimethylacetamide (DMAc) were placed into a three-necked flask. After stirring at 30° C. until complete dissolution, 5.03 g (0.008 mole) of 2,2-bis[4-(3,4-dicarboxyphenoxy)phenyl]hexafluoroisopropane dianhydride (HFBPADA), 7.1 g (0.016 mole) of 2,2'-bis-(3,4-dicarboxyphenyl)hexafluoropropane dianhydride (6FDA), and 4.71 g (0.016 mole) of biphenyltetracarboxylic dianhydride (BPDA) were added, followed by continuous stirring and reaction at 25° C. for 24 hours to obtain a polyamic acid solution of Example 5.

Example 6

6.4 g (0.02 mole) of 2,2'-bis(trifluoromethyl)benzidine (TFMB), 4.97 g (0.02 mole) of 3,3'-diaminodiphenylsulfone (3,3-DDS), and 100 g of dimethylacetamide (DMAc) were placed into a three-necked flask. After stirring at 30° C. until complete dissolution, 2.08 g (0.004 mole) of 4,4'-isopropyl diphenoxy)bis(phthalic anhydride) (BPADA), 8.88 g (0.02 mole) of 2,2'-bis-(3,4-dicarboxyphenyl) hexafluoropropane dianhydride (6FDA), and 4.7 g (0.016 mole) of biphenyltetracarboxylic dianhydride (BPDA) were added, followed by continuous stirring and reaction at 25° C. for 24 hours to obtain a polyamic acid solution of Example 6.

Example 7

3.28 g (0.008 mole) of 2,2'-bis[4-(4-aminophenoxy)phenyl]propane (BAPP), 7.69 g (0.024 mole) of 2,2'-bis(trifluoromethyl)benzidine (TFMB), 1.99 g (0.08 mole) of 3,3'-diaminodiphenylsulfone (3,3-DDS), and 100 g of dimethylacetamide (DMAc) were placed into a three-necked flask. After stirring at 30° C. until complete dissolution, 10.66 g (0.024 mole) of 2,2'-bis-(3,4-dicarboxyphenyl)hexafluoropropane dianhydride (6FDA) and 4.7 g (0.016 mole) of biphenyltetracarboxylic dianhydride (BPDA) were added, followed by continuous stirring and reaction at 25° C. for 24 hours to obtain a polyamic acid solution of Example 7.

Example 8

4.15 g (0.008 mole) of 2,2-bis[4-(4-aminophenoxy)phenyl]-1,1,1,3,3,3-hexafluoropropane (HFBAPP), 7.69 g (0.024 mole) of 2,2'-bis(trifluoromethyl)benzidine (TFMB), 1.99 g (0.08 mole) of 3,3'-diaminodiphenylsulfone (3,3-DDS), and 100 g of dimethylacetamide (DMAc) were placed into a three-necked flask. After stirring at 30° C. until complete dissolution, 10.66 g (0.024 mole) of 2,2'-bis-(3,4-dicarboxyphenyl)hexafluoropropane dianhydride (6FDA) and 4.7 g (0.016 mole) of biphenyltetracarboxylic dianhydride (BPDA) were added, followed by continuous stirring and reaction at 25° C. for 24 hours to obtain a polyamic acid solution of Example 8.

Example 9

3.46 g (0.008 mole) of bis[4-(4-aminophenoxy)phenyl]sulfone (BAPS), 7.69 g (0.024 mole) of 2,2'-bis(trifluoromethyl)benzidine (TFMB), 1.99 g (0.08 mole) of 3,3'-diaminodiphenylsulfone (3,3-DDS), and 100 g of dimethylacetamide (DMAc) were placed into a three-necked flask. After stirring at 30° C. until complete dissolution, 10.66 g (0.024 mole) of 2,2'-bis-(3,4-dicarboxyphenyl)hexafluoropropane dianhydride (6FDA) and 4.7 g (0.016 mole) of biphenyltetracarboxylic dianhydride (BPDA) were added, followed by continuous stirring and reaction at 25° C. for 24 hours to obtain a polyamic acid solution of Example 9.

Example 10

8.97 g (0.028 mole) of 2,2'-bis(trifluoromethyl)benzidine (TFMB), 2.98 g (0.012 mole) of 3,3'-diaminodiphenylsulfone (3,3-DDS), and 100 g of dimethylacetamide (DMAc) were placed into a three-necked flask. After stirring at 30° C. until complete dissolution, 4.16 g (0.008 mole) of 4,4'-(4,4'-isopropyl diphenoxy)bis(phthalic anhydride) (BPADA), 7.1 g (0.016 mole) of 2,2'-bis-(3,4-dicarboxyphenyl)hexafluoropropane dianhydride (6FDA), and 5.73 g (0.016 mole) of 3,3',4,4'-diphenylsulfonetetraanhydride (DSDA) were added, followed by continuous stirring and reaction at 25° C. for 24 hours to obtain a polyamic acid solution of Example 10.

Example 11

8.97 g (0.028 mole) of 2,2'-bis(trifluoromethyl)benzidine (TFMB), 2.54 g (0.012 mole) of M-TOLIDINE, and 100 g of dimethylacetamide (DMAc) were placed into a three-necked flask. After stirring at 30° C. until complete dissolution, 4.16 g (0.008 mole) of 4,4'-(4,4'-isopropyl diphenoxy)bis(phthalic anhydride) (BPADA), 7.1 g (0.016 mole) of 2,2'-bis-(3,4-dicarboxyphenyl)hexafluoropropane dianhydride (6FDA), and 4.71 g (0.016 mole) of biphenyltetracarboxylic dianhydride (BPDA) were added, followed by continuous stirring and reaction at 25° C. for 24 hours to obtain a polyamic acid solution of Example 11.

Example 12

8.97 g (0.028 mole) of 2,2'-bis(trifluoromethyl)benzidine (TFMB), 4 g (0.012 mole) of 2,2-bis(4-aminophenyl)hexafluoropropane (BISAF), and 100 g of dimethylacetamide (DMAc) were placed into a three-necked flask. After stirring at 30° C. until complete dissolution, 4.16 g (0.008 mole) of 4,4'-(4,4'-isopropyl diphenoxy)bis(phthalic anhydride) (BPADA), 7.1 g (0.016 mole) of 2,2'-bis-(3,4-dicarboxyphenyl)hexafluoropropane dianhydride (6FDA), and 4.71 g (0.016 mole) of biphenyltetracarboxylic dianhydride (BPDA) were added, followed by continuous stirring and reaction at 25° C. for 24 hours to obtain a polyamic acid solution of Example 12.

Example 13

3.28 g (0.008 mole) of 2,2'-bis[4-(4-aminophenoxy)phenyl]propane (BAPP), 7.69 g (0.024 mole) of 2,2'-bis(trifluoromethyl)benzidine (TFMB), 1.99 g (0.08 mole) of 3,3'-diaminodiphenylsulfone (3,3-DDS), and 100 g of dimethylacetamide (DMAc) were placed into a three-necked flask. After stirring at 30° C. until complete dissolution, 4.16 g (0.008 mole) of 4,4'-(4,4'-isopropyl diphenoxy)bis (phthalic anhydride) (BPADA), 7.1 g (0.016 mole) of 2,2'-bis-(3,4-dicarboxyphenyl)hexafluoropropane dianhydride (6FDA), and 4.71 g (0.016 mole) of biphenyltetracarboxylic dianhydride (BPDA) were added, followed by continuous stirring and reaction at 25° C. for 24 hours to obtain a polyamic acid solution of Example 13.

The following Comparative Example 1-5 will be further exemplified.

Comparative Example 1

8.97 g (0.028 mole) of 2,2'-bis(trifluoromethyl)benzidine (TFMB), 2.4 g (0.012 mole) of 4,4'-diaminodiphenylether (ODA), and 100 g of dimethylacetamide (DMAc) were placed into a three-necked flask. After stirring at 30° C. until complete dissolution, 12.49 g (0.024 mole) of 4,4'-(4,4'-isopropyl diphenoxy)bis(phthalic anhydride) (BPADA), 5.33 g (0.012 mole) of 2,2'-bis-(3,4-dicarboxyphenyl)hexafluoropropane dianhydride (6FDA), and 1.18 g (0.004 mole) of biphenyltetracarboxylic dianhydride (BPDA) were added, followed by continuous stirring and reaction at 25° C. for 24 hours to obtain a polyamic acid solution of Comparative Example 1.

Comparative Example 2

8.97 g (0.028 mole) of 2,2'-bis(trifluoromethyl)benzidine (TFMB), 2.4 g (0.012 mole) of 4,4'-diaminodiphenylether (ODA), and 100 g of dimethylacetamide (DMAc) were placed into a three-necked flask. After stirring at 30° C. until complete dissolution, 10.66 g (0.024 mole) of 2,2'-bis-(3,4-dicarboxyphenyl)hexafluoropropane dianhydride (6FDA) and 4.7 g (0.016 mole) of biphenyltetracarboxylic dianhydride (BPDA) were added, followed by continuous stirring and reaction at 25° C. for 24 hours to obtain a polyamic acid solution of Comparative Example 2.

Comparative Example 3

12.81 g (0.04 mole) of 2,2'-bis(trifluoromethyl)benzidine (TFMB) and 100 g of dimethylacetamide (DMAc) were placed into a three-necked flask. After stirring at 30° C. until complete dissolution, 16.66 g (0.032 mole) of 4,4'-(4,4'-isopropyl diphenoxy) bis(phthalic anhydride) (BPADA) and 2.35 g (0.008 mole) of biphenyltetracarboxylic dianhydride (BPDA) were added, followed by continuous stirring and reaction at 25° C. for 24 hours to obtain a polyamic acid solution of Comparative Example 3.

Comparative Example 4

8.97 g (0.028 mole) of 2,2'-bis(trifluoromethyl)benzidine (TFMB), 2.98 g (0.012 mole) of 3,3'-diaminodiphenylsulfone (3,3-DDS), and 100 g of dimethylacetamide (DMAc) were placed into a three-necked flask. After stirring at 30° C. until complete dissolution, 4.16 g (0.008 mole) of 4,4'-(4, 4'-isopropyl diphenoxy) bis(phthalic anhydride) (BPADA) and 14.21 g (0.032 mole) of 2,2'-bis-(3,4-dicarboxyphenyl) hexafluoropropane dianhydride (6FDA) were added, followed by continuous stirring and reaction at 25° C. for 24 hours to obtain a polyamic acid solution of Comparative Example 4.

Comparative Example 5

8.97 g (0.028 mole) of 2,2'-bis(trifluoromethyl)benzidine (TFMB), 2.40 g (0.012 mole) of 4,4'-diaminodiphenylether (ODA), and 100 g of dimethylacetamide (DMAc) were placed into a three-necked flask. After stirring at 30° C. until complete dissolution, 4.16 g (0.008 mole) of 4,4'-(4,4'-isopropyl diphenoxy)bis(phthalic anhydride) (BPADA), 3.55 g (0.008 mole) of 2,2'-bis-(3,4-dicarboxyphenyl) hexafluoropropane dianhydride (6FDA), and 7.06 g (0.024 mole) of biphenyltetracarboxylic dianhydride (BPDA) were added, followed by continuous stirring and reaction at 25° C. for 24 hours to obtain a polyamic acid solution of Comparative Example 5.

Measurement of Properties of Polyimide Resins

Figure 2:
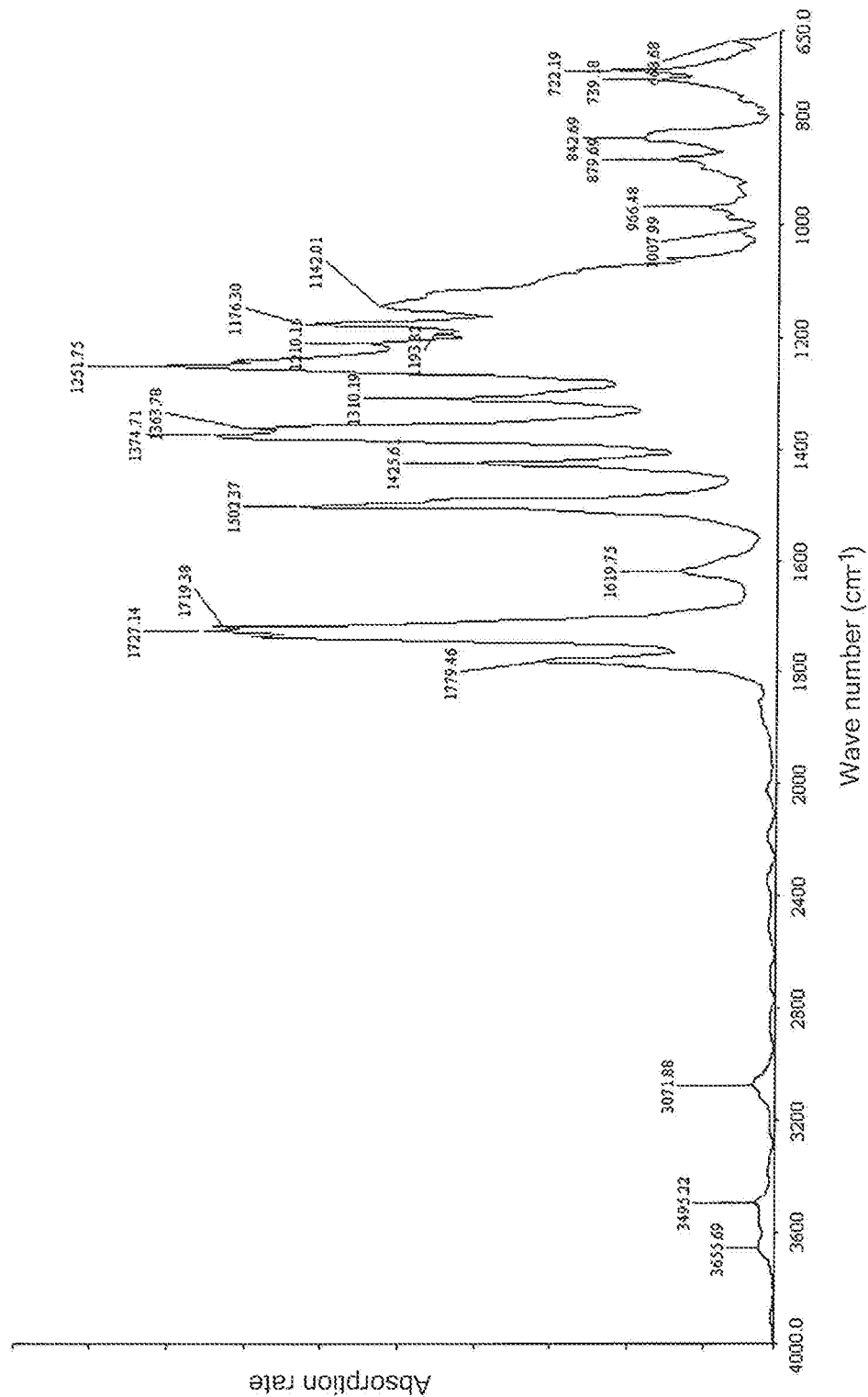
FIG. 2 is the IR spectrum of the polyimide resin of Example 5.
Figure 3:
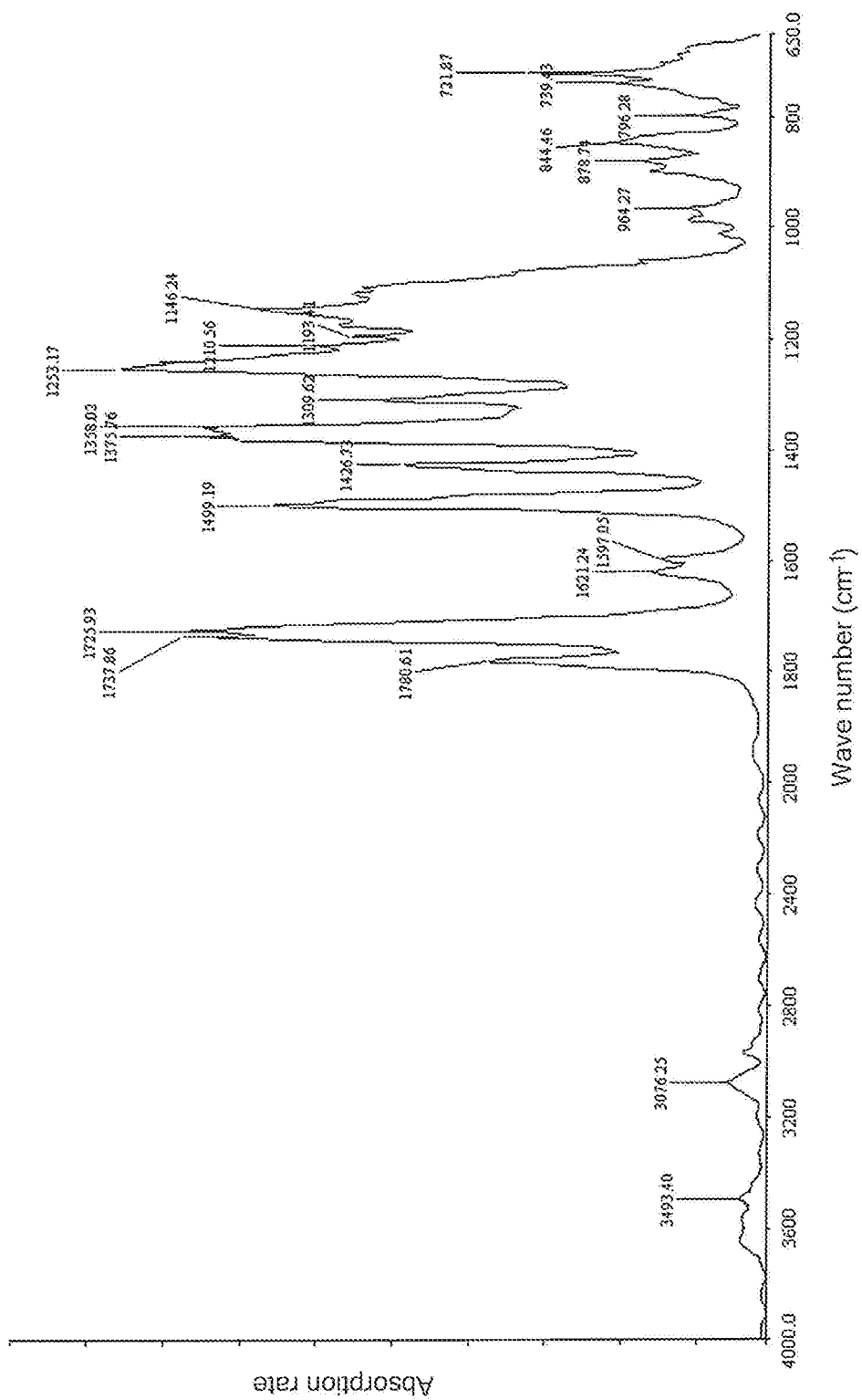
FIG. 3 is the IR spectrum of the polyimide resin of Example 7.
Figure 4:
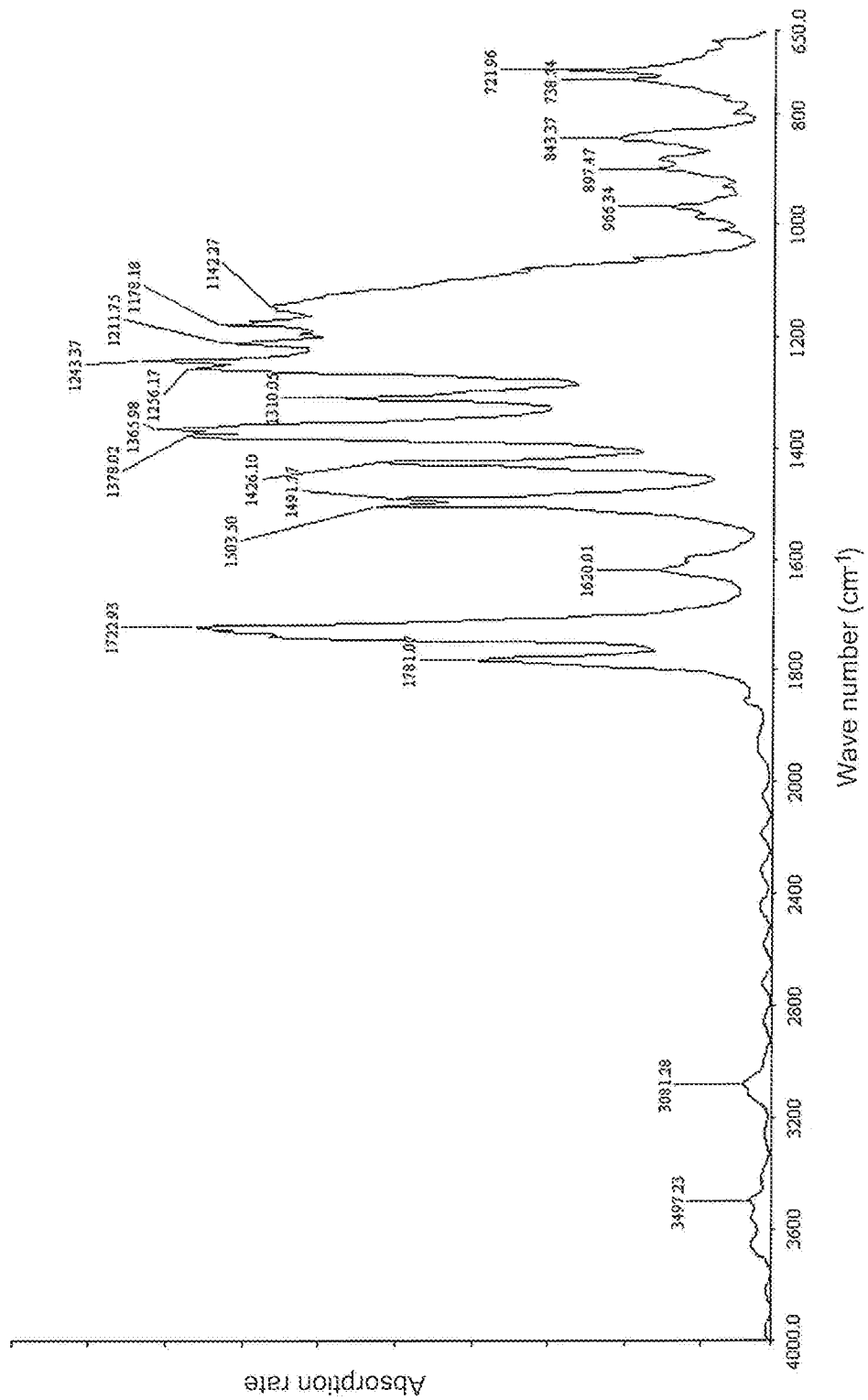
FIG. 4 is the IR spectrum of the polyimide resin of Example 8.
Figure 5:
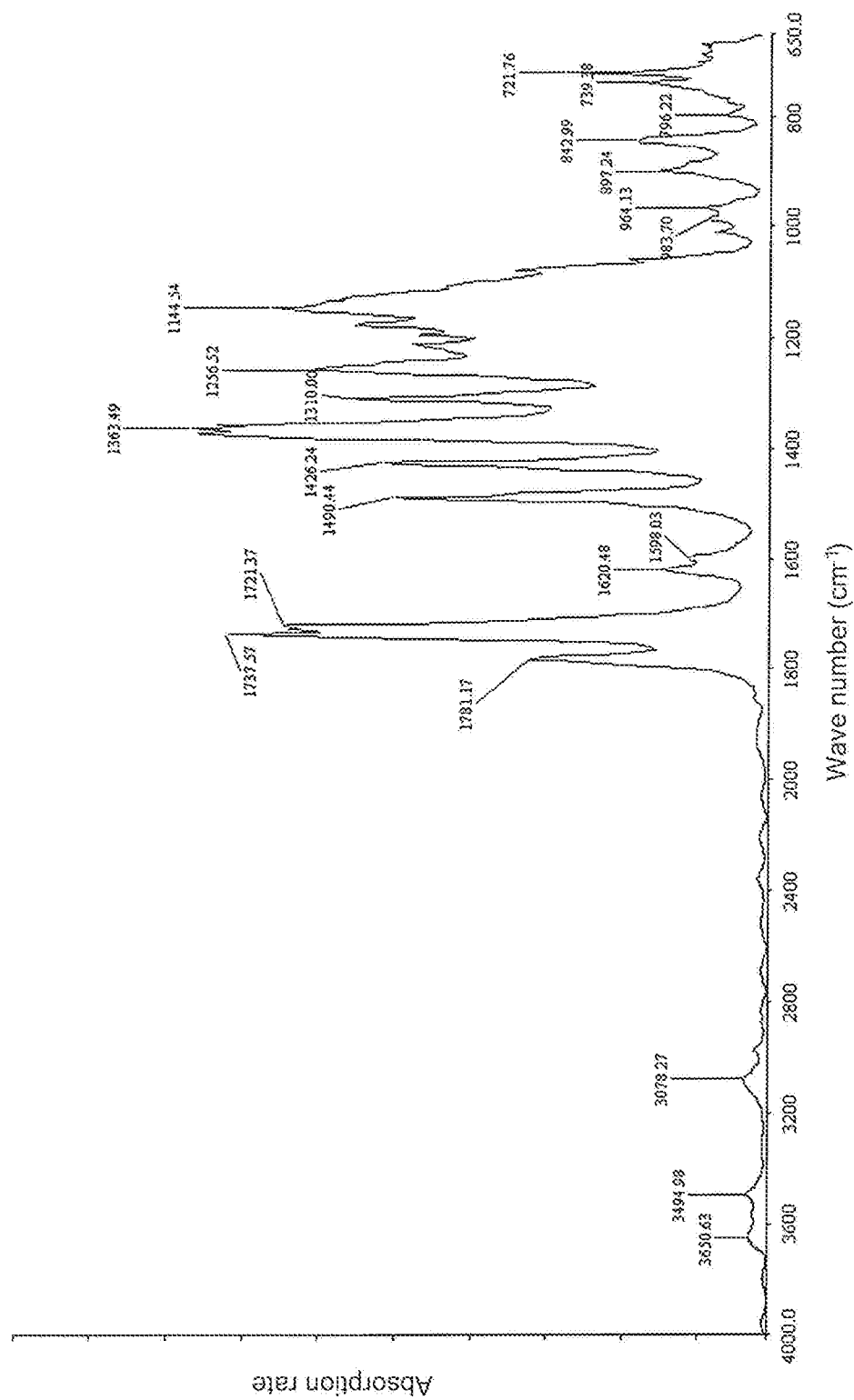
FIG. 5 is the IR spectrum of the polyimide resin of Example 9.
Figure 6:
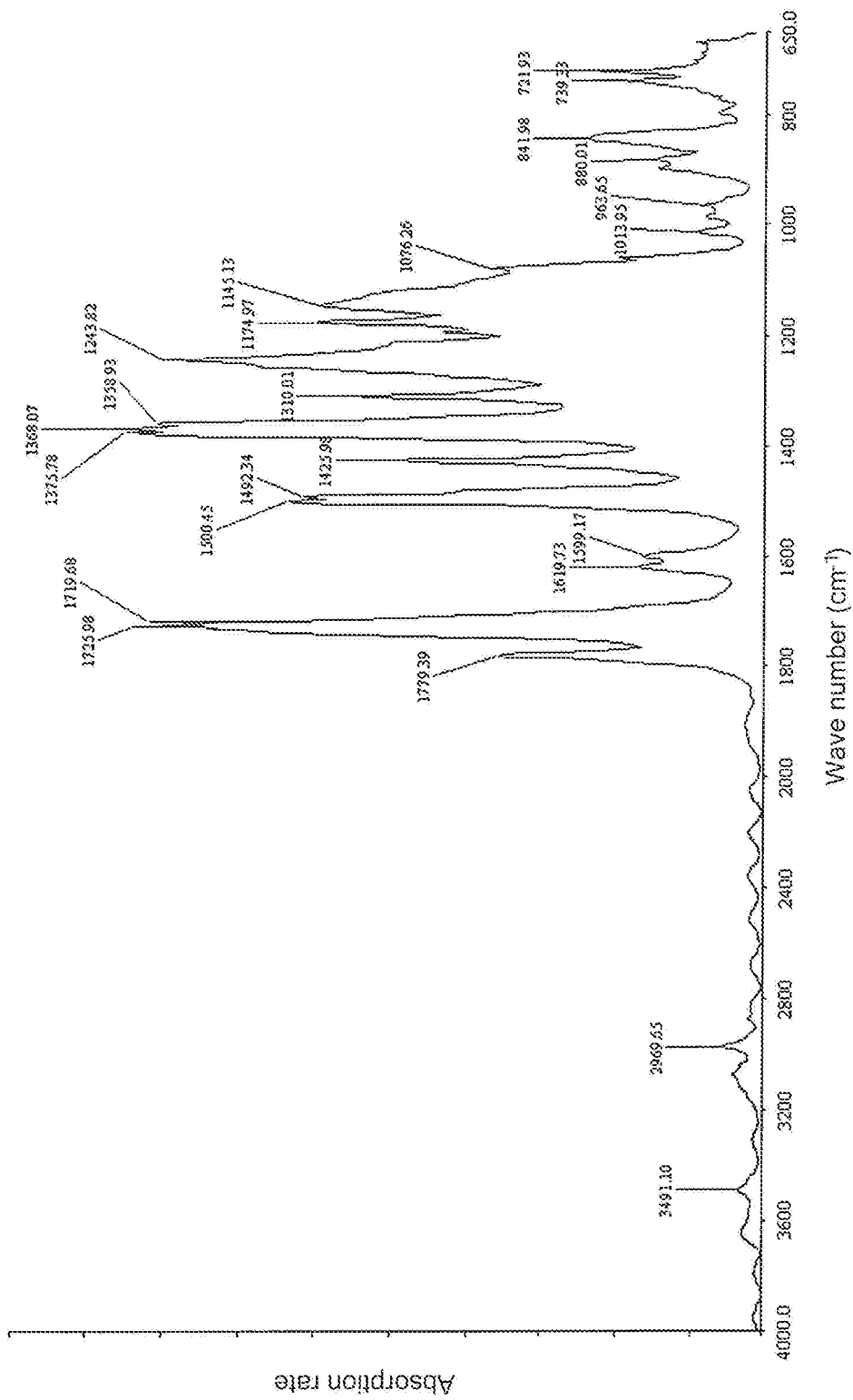
FIG. 6 is the IR spectrum of the polyimide resin of Example 13.

The compositional components and proportions of the polyamic acid solutions of the above Examples and Comparative Examples were summarized in Table 1 below. Examples 1-6 and 10-12 used the dianhydrides having the structure of Formula 1; Examples 7-9 used the diamines having the structure of formula 1; and Example 13 used both the dianhydrides having the structure of Formula 1 and the diacids having the structure of Formula 1. The IR spectra of Examples 1, 5, 7, 8, 9 and 13 were measured as examples, and the results were shown in FIGS. 1-6. In addition, the polyamic acid solutions (polyimide resin precursors) of the Examples and Comparative Examples were imidized to form polyimide films, which were then measured for the transmittance, color property, dielectric constant (Dk), dissipation factor (Df), coefficient of linear thermal expansion (CTE), and glass transition temperature (Tg). The results of data measurements were summarized in Table 2 below.

TABLE 1

The compositions of the polyimide films of the Examples and Comparative Examples

| unit | Dianhydride | | | | | | diamine |
| | Monomer name | | | | | | |
| | BPADA* mole | HFBPADA* mole | 6FDA mole | BPDA mole | ODPA mole | DSDA mole | BAPP* mole |
|---|---|---|---|---|---|---|---|
| Example 1 | 0.008 | | 0.016 | 0.016 | | | |
| Example 2 | 0.02 | | 0.012 | 0.008 | | | |
| Example 3 | 0.008 | | 0.024 | 0.008 | | | |
| Example 4 | 0.008 | | 0.016 | | 0.016 | | |
| Example 5 | | 0.008 | 0.016 | 0.016 | | | |
| Example 6 | 0.004 | | 0.02 | 0.016 | | | |
| Example 7 | | | 0.024 | 0.016 | | | 0.008 |
| Example 8 | | | 0.024 | 0.016 | | | |
| Example 9 | | | 0.024 | 0.016 | | | |
| Example 10 | 0.008 | | 0.016 | | | 0.016 | |
| Example 11 | 0.008 | | 0.016 | 0.016 | | | |
| Example 12 | 0.008 | | 0.016 | 0.016 | | | |
| Example 13 | 0.008 | | 0.016 | 0.016 | | | 0.008 |
| Comparative Example 1 | 0.024 | | 0.012 | 0.004 | | | |
| Comparative Example 2 | | | 0.024 | 0.016 | | | |
| Comparative Example 3 | 0.032 | | | 0.008 | | | |
| Comparative Example 4 | 0.008 | | 0.032 | | | | |
| Comparative Example 5 | 0.008 | | 0.008 | 0.024 | | | |

TABLE 1-continued

The compositions of the polyimide films of the Examples and Comparative Examples

| | diamine Monomer name | | | | | | |
|---|---|---|---|---|---|---|---|
| unit | HFBAPP* mole | BAPS* mole | TFMB mole | ODA mole | 3,3-DDS mole | M-TOLIDINE mole | BISAF mole |
| Example 1 | | | 0.028 | 0.012 | | | |
| Example 2 | | | 0.028 | 0.012 | | | |
| Example 3 | | | 0.028 | | 0.012 | | |
| Example 4 | | | 0.028 | 0.012 | | | |
| Example 5 | | | 0.028 | 0.012 | | | |
| Example 6 | | | 0.02 | | 0.02 | | |
| Example 7 | | | 0.016 | | 0.016 | | |
| Example 8 | 0.008 | | 0.024 | | 0.008 | | |
| Example 9 | | 0.008 | 0.024 | | 0.008 | | |
| Example 10 | | | 0.028 | | 0.012 | | |
| Example 11 | | | 0.028 | | | 0.012 | |
| Example 12 | | | 0.028 | | | | 0.012 |
| Example 13 | | | 0.024 | | 0.008 | | |
| Comparative Example 1 | | | 0.028 | 0.012 | | | |
| Comparative Example 2 | | | 0.028 | 0.012 | | | |
| Comparative Example 3 | | | 0.04 | | | | |
| Comparative Example 4 | | | 0.028 | | 0.012 | | |
| Comparative Example 5 | | | 0.028 | 0.012 | | | |

*The monomer having the structure of Formula 1

TABLE 2

Properties of the polyimide films of the Examples and Comparative Examples

| | The proportion of the content of the compound of formula 1 (mole %) | Tg(° C.) | CTE(ppm/° C.) | $T_{550}$ % | b* | Dk | Df |
|---|---|---|---|---|---|---|---|
| Example 1 | 20% | 301 | 28.9 | 87.6 | 1.1 | 2.95 | 0.0081 |
| Example 2 | 50% | 270 | 38.2 | 85.8 | 1.3 | 2.87 | 0.0052 |
| Example 3 | 20% | 282 | 29.1 | 88.9 | 0.9 | 2.93 | 0.0088 |
| Example 4 | 20% | 275 | 37.5 | 86.2 | 2.1 | 3.05 | 0.0080 |
| Example 5 | 20% | 293 | 29.2 | 88.1 | 1.2 | 2.89 | 0.0078 |
| Example 6 | 10% | 308 | 26.4 | 86.7 | 1.5 | 3.05 | 0.009 |
| Example 7 | 20% | 283 | 30.5 | 85.7 | 2.1 | 3.03 | 0.0081 |
| Example 8 | 20% | 286 | 44 | 86.8 | 1.9 | 2.96 | 0.0078 |
| Example 9 | 20% | 289 | 39.6 | 85.9 | 2.2 | 3.00 | 0.0087 |
| Example 10 | 20% | 280 | 41.2 | 86.3 | 2.2 | 2.92 | 0.0086 |
| Example 11 | 20% | 282 | 41.6 | 85.3 | 2.7 | 3.05 | 0.0077 |
| Example 12 | 20% | 278 | 43.1 | 85.6 | 2.4 | 2.91 | 0.0080 |
| Example 13 | 40% | 275 | 40.8 | 87.1 | 2.5 | 2.98 | 0.072 |
| Comparative Example 1 | 60% | 252 | 58.2 | 86.8 | 2.3 | 3.01 | 0.0072 |
| Comparative Example 2 | 0% | 285 | 38.0 | 88.0 | 1.6 | 3.30 | 0.0114 |
| Comparative Example 3 | 80% | 220 | 69.1 | 85.3 | 4.0 | 2.93 | 0.0058 |
| Comparative Example 4 | 20% | 266 | 52.2 | 89.1 | 0.8 | 2.92 | 0.0087 |
| Comparative Example 5 | 20% | 311 | 27.0 | 84.4 | 4.1 | 3.23 | 0.0093 |

Table 2 lists the properties of films made from the polyamic acid solutions, in which the properties are measured by the following methods:

Transmittance (T %) The transmittance of the thin film having a thickness of about 20 μm was measured at a wavelength of 550 nm using a spectrometer (brand: Jasco: Model V-530).

Color Property

The color property of the polyimide films was measured at a temperature of about 25° C. using a colorimeter, and represented by the b* value of the "Lab color space". The b* value is defined as the color boundary between blue and yellow. When the b value is greater than 3, the film shows light yellow.

Glass Transition Temperature (Tg):

The glass transition temperature was determined using a differential scanning calorimeter (DSC-6220) manufactured by SII Nano Technology. Under the nitrogen atmosphere, the polyimide resin was subjected to the following thermal conditions: A first temperature rise (Heating-up rate: 10° C./min), followed by cooling (cooling-down rate: 30° C./min), followed by a second temperature rise (heating-up rate: 10° C./min). The glass transition temperature of the present invention was read and determined by the value observed during the first temperature rise or the second temperature rise.

Coefficient of Linear Thermal Expansion (CTE):

By the thermomechanical analysis, the average value of extension of the test sheet under a load weight of 3 g/a film thickness of 20 μm and a heating-up rate of 10° C./min from 50 to 200° C. was calculated as the coefficient of linear thermal expansion. In the heating and baking process for manufacturing circuit boards, less linear thermal expansion can prevent the material from excessive deformation, so that the production line can maintain a high yield.

Dielectric Constant (Dk):

The measurement was carried out at 10 GHz following the IPC-TM-650-2.5.5.9 standard method using a measuring instrument (brand: Agilent; model: HP4291).

Dissipation Factor (Df):

The measurement was carried out at 10 GHz following the IPC-TM-650-2.5.5.9 standard method using a measuring instrument (brand: Agilent; model: HP4291).

The requirements for high-frequency circuit is the speed and quality of the transmission signal, which are mainly affected by the electrical characteristics of the transmission material, i.e. the dielectric constant (Dk) and dissipation factor (Df) of the material, as illustrated by the following signal transmission formula:

$$\alpha_d = 0.9106 \times \sqrt{\varepsilon_R} \times F_{GHz} \times \tan\delta$$

$\alpha_d$: transmission loss
$\varepsilon_R$: dielectric constant (Dk)
$F_{GHz}$: frequency
$\tan\delta$: dissipation factor (Df)

From the above formula, it is known that the influence of Df is greater than that of Dk. Therefore, the lower the Df value is, the less the transmission loss will be, which means the material is more suitable for the high frequency components.

As seen from Table 1 and Table 2, at least one of the dianhydride monomers and the diamine monomers used in Examples 1-9 of the present invention has the following structure of Formula 1.

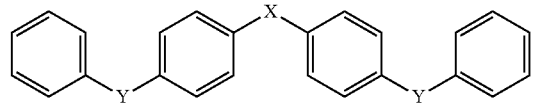
(Formula 1)

X is $SO_2$, $C(CH_3)_2$ or $C(CF_3)_2$, and Y is oxygen.

The polyimide resin formed from the polymerization of the monomer having the structure of Formula 1 can form a huge space barrier by the structure of Formula 2 to hinder the molecular chain from rotation.

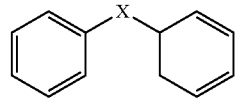
(Formula 2)

Moreover, it is also possible to enhance the degree of regular alignment of the formation of the polyimide polymer from the polyamic acid solution (polyimide resin precursor) by the structure of Formula 3, thereby obtaining the polyimide resin having a lower dissipation factor.

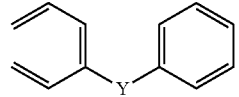
(Formula 3)

As shown in the experimental results, the polyimide of Comparative Example 2 has a dissipation factor (Df) of greater than 0.01 owing to not using the dianhydride/diamine monomer having the structure of Formula 1, although the polyimide film formed therefrom was transparent. With reference to Examples 1-13, the Df of the polymer of Comparative Example 2 had a greater change (having a lower dissipation factor Df) after the monomer containing the structure of Formula 1 was added, and the resulting polyimide film remains transparent.

In addition, the introduction of 2,2'-bis-(3,4-dicarboxyphenyl)hexafluoropropane dianhydride monomer (6FDA) (and the content thereof being limited to 30-60%, based on the total number of moles of the dianhydride monomers) enhances the film's transparent and colorless characteristics by the electron-withdrawing effect of fluorine atoms and the steric hindrance caused by trifluoromethyl groups. For example, since the polyimide resin of Comparative Example 3 doesn't use 6FDA dianhydride, it has a chromaticity value of up to 4 and shows a tan color, which means the colorless and transparent requirements can't be achieved.

The effects of different monomer ratios on the properties of polyimide resins were analyzed. Comparative Example 1 uses a higher proportion of BPADA dianhydride monomer, as compared with Example 2. Although the Df value of Comparative Example 1 is less than 0.01, the thermal properties of Comparative Example 1 are poor (Tg is low and CTE is greater than 50 ppm/k). Comparative Example 3 was synthesized with reference to the monomer proportion of Patent Document 1, and the BPADA ratio was also higher. The synthesized polyimide resin exhibited excellent dielectric properties, but the thermal properties (Tg and CTE) were also too poor to be used in high temperature processes, and there existed a possibility of deformation in the heating and baking process. In addition, the color property, b value, of Comparative Example 3 was too large so that the film was yellowish. In the comparison of Comparative Example 4 with Example 3, increasing the addition ratio of 6FDA remarkably improved the optical properties of the thin film, however, the thermal properties (Tg and CTE) of the polyimide resin film were also poor. In the comparison of Comparative Example 5 with Embodiment 1, reducing the addition amount of 6FDA resulted in poor performance of optical properties of the thin film, and the film exhibited pale yellow. Therefore, the examples of the present invention, which mixed two or more dianhydride or diamine monomers, added the monomer having the structure of Formula 1 and limited the ratio of the monomer having the structure of Formula 1, can find a balance point between low Df, low Dk, low b*, high Tg, and low CTE, thereby obtaining the polyimide resin suitable for the electronic device substrate applications (For example, a flexible circuit board, a substrate for a display device, a substrate for a touch panel, a substrate for a transparent antenna, a substrate for a high-frequency transmission line, and the like).

While the invention is illustrated by the embodiments above, these embodiments are not intended to limit the invention. Such embodiments may be equivalently implemented or modified by those skilled in the art without departing from the spirit of the art of the invention, and thus the scope of the present invention should be determined by the appended claims.

Patent document 1 Patent of R.O.C. I462952B

What is claimed is:

1. A colorless transparent polyimide resin obtained by copolymerizing at least three dianhydride monomers and at least two diamine monomers:
    two of the dianhydride monomers being 2,2'-bis-(3,4-dicarboxyphenyl)hexafluoropropane dianhydride and 4,4'-(4,4'-isopropylidenediphenoxy)bis(phthalic anhydride), the content of 2,2'-bis-(3,4-dicarboxyphenyl)hexafluoropropane dianhydride is 30-60%, based on the total number of moles of the dianhydride monomers, and the remaining dianhydride monomer(s) being selected from the group consisting of 4,4'-diphenylether tetracarboxylic dianhydride, biphenyltetracarboxylic dianhydride, 3,3',4,4'-diphenylsulfonetetracarboxylic dianhydride, and 2,2-bis[4-(3,4-dicarboxyphenoxy)phenyl]hexafluoroisopropane dianhydride;
    the diamine monomers being selected from the group consisting of bis[4-(4-aminophenoxy)phenyl]sulfone, 2,2'-bis[4-(4-aminophenoxy)phenyl]propane, 2,2-bis[4-(4-aminophenoxy)phenyl]-1,1,1,3,3,3-hexafluoropropane, 2,2'-bis(trifluoromethyl)benzidine, 4,4'-diaminodiphenylether, 3,3'-diaminodiphenylsulfone, m-tolidine, and 2,2-bis(4-aminophenyl)hexafluoropropane;
    wherein the colorless transparent polyimide resin has a dissipation factor of less than 0.01 at 10 GHz and a yellow value (b*) of less than 3, and at least one of the dianhydride monomers and the diamine monomers is selected from the group consisting of 4,4'-(4,4'-isopropylidenediphenoxy)bis(phthalic anhydride), 2,2-bis[4-(3,4-dicarboxyphenoxy)phenyl]hexafluoroisopropane dianhydride, bis[4-(4-aminophenoxy)phenyl]sulfone, 2,2'-bis[4-(4-aminophenoxy)phenyl]propane, and 2,2-bis[4-(4-aminophenoxy)phenyl]-1,1,1,3,3,3-hexafluoropropane, and a content of the monomer is higher than 10% but less than or equal to 50%, based on the total number of moles of the dianhydride monomers or the diamine monomers.

2. The colorless transparent polyimide resin of claim 1, having a transmittance of more than 85% at a wavelength of 550 nm.

3. The colorless transparent polyimide resin of claim 1, having a glass transition temperature of higher than 270° C. and a coefficient of linear thermal expansion between 20 and 50 ppm/k.

4. The colorless transparent polyimide resin of claim 1, wherein at least one of the dianhydride monomers and the diamine monomers is selected from the group consisting of 4,4'-(4,4'-isopropylidenediphenoxy)bis(phthalic anhydride), 2,2-bis[4-(3,4-dicarboxyphenoxy)phenyl]hexafluoroisopropane dianhydride, bis[4-(4-aminophenoxy)phenyl]sulfone, 2,2'-bis[4-(4-aminophenoxy)phenyl]propane, and 2,2-bis[4-(4-aminophenoxy)phenyl]-1,1,1,3,3,3-hexafluoropropane, and a content of the monomer is 20-50%, based on the total number of moles of the dianhydride monomers or the diamine monomers.

5. A thin film, including the colorless transparent polyimide resin of claim 1.

6. A flexible circuit board, comprising the thin film of claim 5.

7. A substrate for a display device, comprising the thin film of claim 5.

8. A substrate for a touch panel, comprising the thin film of claim 5.

9. A substrate for a transparent antenna, comprising the thin film of claim 5.

10. A substrate for a high-frequency transmission line, comprising the thin film of claim 5.

11. A method for preparing a colorless transparent polyimide resin, comprising the steps of:
    (a) dissolving at least three dianhydride monomers and at least two diamine monomers using a solvent, two of the dianhydride monomers being 2,2'-bis-(3,4-dicarboxyphenyl)hexafluoropropane dianhydride and 4,4'-(4,4'-isopropylidenediphenoxy)bis(phthalic anhydride), the content of 2,2'-bis-(3,4-dicarboxyphenyl)hexafluoropropane dianhydride is 30-60%, based on the total number of moles of the dianhydride monomers, and the remaining dianhydride monomer(s) being selected from the group consisting of 4,4'-diphenylether tetracarboxylic dianhydride, biphenyltetracarboxylic dianhydride, 3,3',4,4'-diphenylsulfonetetracarboxylic dianhydride, and 2,2-bis[4-(3,4-dicarboxyphenoxy)phenyl]hexafluoroisopropane dianhydride; the diamine monomers being selected from the group consisting of bis[4-(4-aminophenoxy)phenyl]sulfone, 2,2'-bis[4-(4-aminophenoxy)phenyl] propane, 2,2-bis[4-(4-aminophenoxy)phenyl]-1,1,1,3,3,3-hexafluoropropane, 2,2'-bis(trifluoromethyl)benzidine, 4,4'-diaminodiphenylether, 3,3'-diaminodiphenylsulfone, m-tolidine, and 2,2-bis(4-aminophenyl)hexafluoropropane; wherein at least one of the dianhydride monomers and the diamine monomers is selected from the group consisting of 4,4'-(4,4'-isopropylidenediphenoxy)bis(phthalic anhydride), 2,2-bis[4-(3,4-dicarboxyphenoxy)phenyl]hexafluoroisopropane dianhydride, bis[4-(4-aminophenoxy)phenyl]sulfone, 2,2'-bis[4-(4-aminophenoxy)phenyl]propane, and 2,2-bis[4-(4-aminophenoxy)phenyl]-1,1,1,3,3,3-hexafluoropropane, and a content of the monomer is higher than 10% but less than or equal to 50%, based on the total number of moles of the dianhydride monomers or the diamine monomers;

(b) mixing the dissolved dianhydride monomers with the dissolved diamine monomers to carry out a polymerization reaction, thereby forming a polyamic acid resin, wherein the ratio of the total number of moles of the dianhydride monomers to the total number of moles of the diamine monomers is from 0.85 to 1.15; and (c) imidizing the polyamic acid resin to form the colorless transparent polyimide resin having a dissipation factor of less than 0.01 at 10 GHz and a yellow value (b*) of less than 3.

12. The method of claim 11, wherein the solvent is an aprotic solvent.

13. The method of claim 11, wherein the solvent is selected from the group consisting of N,N-dimethylacetamide, N,N-diethylacetamide, N,N-dimethylformamide, and N-methyl-2-pyrrolidone.

14. A colorless transparent polyimide resin made by the method of claim 11, having a transmittance of more than 85% at a wavelength of 550 nm.

15. A colorless transparent polyimide resin made by the method of claim 11, having a glass transition temperature of higher than 270° C. and a coefficient of linear thermal expansion between 20 and 50 ppm/k.

* * * * *